(12) United States Patent
Heaton

(10) Patent No.: US 7,382,943 B1
(45) Date of Patent: Jun. 3, 2008

(54) FOUR ARM LINEARISED MACH ZEHNDER MODULATOR

(75) Inventor: John Heaton, Worcestershire (GB)

(73) Assignee: Filtronic, PLC, West Yorkshire (GB)

( * ) Notice: Subject to any disclaimer, the term of this patent is extended or adjusted under 35 U.S.C. 154(b) by 0 days.

(21) Appl. No.: 11/776,583

(22) Filed: Jul. 12, 2007

(51) Int. Cl.
*G02F 1/225* (2006.01)
*G02F 1/035* (2006.01)

(52) U.S. Cl. ............................................ 385/3; 385/40
(58) Field of Classification Search ...................... None
See application file for complete search history.

(56) References Cited

U.S. PATENT DOCUMENTS 5,109,441 A * 4/1992 Glaab ............................. 385/1
5,161,206 A * 11/1992 Djupsjobacka ................. 385/2
6,341,031 B1 * 1/2002 McBrien et al. ............ 359/237

* cited by examiner

*Primary Examiner*—Rodney Bovernick
*Assistant Examiner*—Mike Stahl
(74) *Attorney, Agent, or Firm*—Howard & Howard Attorneys, P.C.

(57) ABSTRACT

A four arm linearized Mach Zehnder modulator comprising first and second primary electro-optic waveguides;
first and second secondary electro-optic waveguides, each secondary electro-optic waveguide being arranged adjacent to a primary electro-optic waveguide;
an RF electrode having a stub extending therefrom, the stub having a first foot portion extending partially along the first primary electro-optic waveguide and a second foot portion extending at least partially along the first secondary electro-optic waveguide;
an RF ground electrode having a stub extending therefrom, the stub having a first foot portion extending partially along the second primary electro-optic waveguide and a second foot portion extending at least partially along the second secondary electro-optic waveguide;
an optical source for providing an optical signal to the waveguides;
the RF electrodes being arranged such that when a voltage is applied between the RF electrode and RF ground electrode the magnitudes of the phase shifts experienced by the signals in the primary electro-optic waveguides are the same and the magnitudes of the phase shifts experienced by the signals in the secondary electro-optic waveguides are the same but different to those in the primary electro-optic waveguides.

30 Claims, 1 Drawing Sheet

FOUR ARM LINEARISED MACH ZEHNDER MODULATOR

Figure 1:
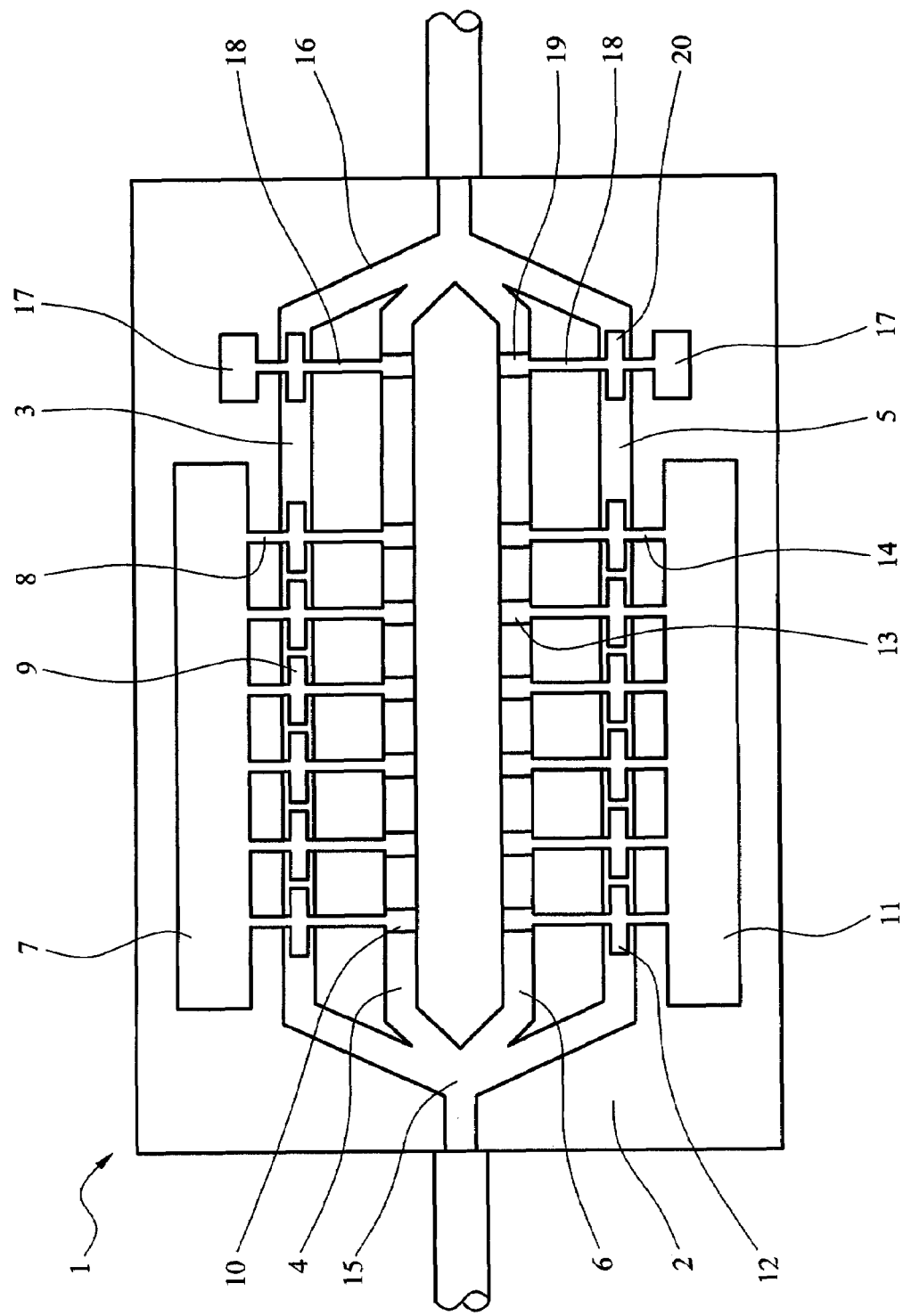

The present invention relates to a four arm linearised Mach Zehnder modulator. More particularly, but not exclusively, the present invention relates to a four arm Mach Zehnder modulator having a pair of primary and a pair of secondary optical waveguides, all four waveguides being addressed by the same RF travelling wave electrode.

Mach Zehnder modulators for modulating optical signals are known. Typically a conventional two arm Mach Zehnder modulator will split an incoming signal into two signals. A sinusoidal electric field is applied to one of the signal paths. This produces a phase shift in the optical signal in that path. The phase shifter optical signal is then recombined with the signal in the other arm. The constructive/destructive recombination of the two optical waves provides a modulation in the intensity of the output optical signal as a function of the applied electric field.

Optical modulators for the accurate transmission of microwave signals (1-20 GHz) along optical fibres are very difficult to produce with sufficiently high linearity between input microwave voltage and output optical intensity (L-V function) over a wide bandwidth. A conventional two arm Mach Zehnder modulator has a spurious free dynamic range (SFDR) of approximately 70 dB in an 1 MHz bandwidth. This is mainly because the third harmonic of the modulating signal appears above the noise floor at the upper RF power limit of the spurious free dynamic range. To overcome this problem four arm Mach Zehnder modulators are used. The two additional arms are used to suppress the third harmonic of the L-V function. This allows higher microwave powers to be passed through the device before the third harmonic appears above the noise floor. This in effect increases the spurious free dynamic range and modulation depth of the modulator.

However, by adding the extra two arms in which the optical intensities and phases have to be controlled very accurately relative to those in the two original guides, it is more difficult to maintain the higher SFDR of the four arm linearised modulator over the full broadband RF range than it is to control a conventional two arm Mach Zehnder electro-optic modulator for the lower SFDR.

U.S. Pat. No. 5,161,206 discloses a four arm Mach Zehnder modulator. The optical input is split into two pairs of optical signal paths, each pair with its own modulating electrodes. The modulating RF signal is split between the two pairs of optical signal paths. The length of the electrodes is such that one pair provides the main modulation signal and the other pair provides a desired frequency of the harmonic in order to suppress that harmonic in the output signal. Due to the splitting of the RF signal between two waveguides this modulator suffers from the problem above.

The present invention seeks to overcome this problem.

Accordingly, in a first aspect, the present invention provides a four arm linearised Mach Zehnder modulator comprising first and second primary electro-optic waveguides;

first and second secondary electro-optic waveguides, each secondary electro-optic waveguide being arranged adjacent to a primary electro-optic waveguide;

an RF electrode having a stub extending therefrom, the stub having a first foot portion extending partially along the first primary electro-optic waveguide and a second foot portion extending at least partially along the first secondary electro-optic waveguide;

an RF ground electrode having a stub extending therefrom, the stub having a first foot portion extending partially along the second primary electro-optic waveguide and a second foot portion extending at least partially along the second secondary electro-optic waveguide;

an optical source for providing an optical signal to the waveguides;

the RF electrodes being arranged such that when a voltage is applied between the RF electrode and RF ground electrode the magnitudes of the phase shifts experienced by the signals in the primary electro-optic waveguides are the same and the magnitudes of the phase shifts experienced by the signals in the secondary electro-optic waveguides are the same but different to those in the primary electro-optic waveguides.

All four electro-optic waveguides are addressed by the same travelling wave electrode. There is no need to split the input RF signal between two travelling wave transmission lines, one for each pair of electro-optic waveguides. This allows the required phase shifts in the arms to be controlled accurately so improving the SFDR and modulation depth of the modulator.

Preferably, the electrodes are arranged such that the ratio of the phase change between optical signals in the primary electro-optic waveguides to the phase change between the optical signals in the secondary electro-optic waveguides is in the range 1.5:1 to 4:1.

Preferably, the electrodes are arranged such that the ratio of the phase change between optical signals in the primary electro-optic waveguides to the phase change between the optical signals in the secondary electro-optic waveguides is in the range 1.5:1 to 2.5:1, preferably 1.8:1 to 2.2:1, more preferably 2:1.

Alternatively, the electrodes are arranged such that the ratio of the phase change between optical signals in the primary electro-optic waveguides to the phase change between the optical signals in the secondary electro-optic waveguides is in the range 2.5:1 to 3.5:1, preferably 2.8:1 to 3.2:1, more preferably 3:1.

The Mach Zehnder modulator can further comprise an optical splitter for receiving the optical signal from the optical source and splitting it between the electro-optic waveguides.

Preferably, the optical splitter splits the optical signal such that the intensity of the optical signal in the secondary electro-optic waveguides is between 3.375 and 64 times the intensity of the optical signal in the primary electro-optic waveguides.

Preferably, the optical splitter splits the optical signal such that the intensity of the optical signal in the secondary electro-optic waveguides is between 3 and 20 times the intensity of the optical signal in the primary electro-optic waveguides, preferably between 5 and 15 times the intensity, more preferably 8 times.

Alternatively, the optical splitter splits the optical signal such that the intensity of the optical signal in the secondary electro-optic waveguides is between 10 and 50 times the intensity of the optical signal in the primary electro-optic waveguides, preferably between 15 and 40 times the intensity, more preferably 27 times.

Preferably, each of the RF electrodes comprises a plurality of stubs, each stub comprising first and second foot portions.

Preferably, the four arm linearised Mach Zehnder modulator further comprises an optical combiner for receiving the optical signals from the electro-optic waveguides and combining the amplitudes of the signals to produce an output optical signal.

The four arm linearised Mach Zehnder modulator can further comprise an RF signal source connected to the RF electrode and RF ground electrode so as to provide a modulation signal for modulation of the optical signals propagating in the electro-optic waveguides.

Preferably, the four arm linearised Mach Zehnder modulator further comprises at least one DC tuning electrode proximate to at least one electro-optic waveguide, the DC tuning electrode being connected to a DC power supply.

Preferably, the four arm linearised Mach Zehnder modulator comprises a DC tuning electrode proximate to each optical waveguide, each DC tuning electrode being connected to a DC power supply.

The DC tuning electrodes can adjust the phase of optical signals in at least one of the primary and secondary electro-optic waveguides such that the combiner combines the signals in quadrature.

Preferably, the RF electrodes are adapted such that the propagation velocity of the electromagnetic wave therein is matched to the propagation velocity of the optical signals in the electro-optic waveguides.

Preferably, the first and second primary electro optic waveguides are parallel.

Preferably, the first and second secondary electro optic waveguides are parallel.

Preferably, all four electro optic waveguides are parallel, the two secondary electro optic waveguides being arranged between the two primary electro optic waveguides.

The present invention will now be described by way of example only and not in any limitative sense with reference to the accompanying drawing in which FIG. 1 shows a four arm linearised Mach Zehnder modulator according to the invention.

FIG. 1 shows a four arm linearised Mach Zehnder modulator 1 according to the invention fabricated on a Gallium Arsenide substrate 2. The modulator 1 comprises a first primary electro-optic waveguide 3. Parallel and close to the first primary electro-optic waveguide 3 is a first secondary electro-optic waveguide 4. The modulator 1 also comprises a pair of second primary and second secondary electro-optic waveguides 5,6. These are arranged proximate and parallel to each other but are spaced apart from the first electro-optic waveguides 3,4 as shown. All four electro optic waveguides 3,4,5,6 are parallel, with the secondary electro optic waveguides 4,6 being arranged between the primary electro optic waveguides 3,5 as shown. With standard micro fabrication techniques a primary and its associated secondary electro-optic waveguide can be placed within a few microns of each other, typically in the range 20 to 30 microns.

The modulator 1 further comprises an RF electrode 7. Extending from the RF electrode 7 are a plurality of stubs 8. Each stub 8 comprises first and second foot portions 9,10. The first foot portion 9 extends partially along the first primary electro-optic waveguide 3. The second foot portion 10 extends partially along the first secondary electro-optic waveguide 4 as shown.

The modulator 1 further comprises an RF ground electrode 11 which in this embodiment is identical to the RF electrode 7. First and second foot portions 12,13 of the stubs 14 extend along the second primary and secondary electro-optic waveguides 5,6 as shown.

The foot portions 9,10,12,13 are sufficiently close to the electro-optic waveguides 3,4,5,6 that when a potential is applied to the RF electrode 7,11 the electric field from the foot portion 9,10,12,13 extends into the electro-optic waveguide 3,4,5,6. This alters the refractive index of the electro-optic waveguide 3,4,5,6 so inducing a phase shift in an optical signal passing along the electro-optic waveguide 3,4,5,6.

The modulator 1 further comprises an optical splitter 15 adapted to receive an optical signal from an optical source (not shown) and split it between the electro-optic waveguides 3,4,5,6. The optical source is typically a laser or other coherent light source. In this embodiment the splitter 15 is a passive Y junction splitter. In alternative embodiments the splitter could be a passive or electro-optic waveguide component using for example Y junctions or directional couplers.

An optical combiner 16 receives the output from the electro-optic waveguides 3,4,5,6 and combines it in to a single output. The optical combiner is a passive Y junction combiner.

In alternative embodiments the optical combiner could be a passive or electro-optic component using for example Y junctions or directional couplers. Preferably, at least one of the combiner and splitter is electro-optically tuneable.

Arranged between the RF electrodes 7,11 and the optical combiner 16 are DC tuning electrodes 17 which extend along the optical waveguides 3,4,5,6. The DC tuning electrodes 17 are connected to DC power supplies (not shown).

In use the optical source provides an optical signal to the modulator 1. The optical splitter 15 receives the signal and splits it between the electro-optic waveguides 3,4,5,6. The signal propagates along the electro-optic waveguides 3,4,5,6 to the optical combiner 16. An RF source (not shown) provides an RF signal between the RF electrode 7 and RF ground electrode 11. The stubs 8,14 introduce a capacitance into the RF travelling wave electrodes 7,11. This slows the speed of the propagating RF wave to match the speed of the optical signal in the electro-optic waveguides 3,4,5,6. For Gallium Arsenide this is approximately one third the speed of light in a vacuum. If this were not the case there would be minimal coupling between the optical and microwave signals.

As the optical signals propagate along the electro-optic waveguides 3,4,5,6 they pass beneath the foot portions 9,10,12,13 of the RF electrodes 7,11. The change in refractive index induced by electric field from the foot portions 9,10,12,13 induces phase changes in the optical signals as they pass beneath the foot portions 9,10,12,13. The degree of phase change depends upon the magnitude of the electric field and also the length of the foot portions 9,10,12,13. Optical signals spend a longer time underneath a longer foot portion 10,13 so increasing the degree of phase change. Importantly, the first and second foot portions 9,10 extending along the first primary and secondary electro-optic waveguides 3,4 are driven by the same RF electrode 7. The foot portions 9,10 therefore experience the same potential and hence generate the same electric field at essentially the same time. The difference in phase change between optical signals travelling along the first primary and first secondary electro-optic waveguides 3,4 can therefore be simply controlled by the difference in length of the foot portions 9,10. In contrast, the modulators of the prior art control the difference in phase change by splitting the RF signal between RF waveguides and using the different waveguides to control the phase change in the different electro-optic waveguides.

The same comments apply to the foot portions 12,13 on the second primary and second secondary electro-optic waveguides 5,6. Due to the symmetry of the device the phase changes of the optical signal in the first primary electro-optic waveguide 3 is equal and opposite to the phase change of the optical signal in the second primary electro-optic waveguide 5. Similarly, the phase change of the optical signal in the first secondary electro-optic waveguide 4 is equal and opposite to the phase change in the second secondary electro-optic waveguide 6.

After the appropriate phase changes the optical signals pass beneath DC tuning electrodes 17. Each DC tuning electrode 17 comprises a stub 18 having first and second foot portions 19,20 which extend along the electro-optic waveguides 3,4,5,6 as shown. Each DC tuning electrode 17 is connected to a DC power supply. After passing beneath the DC tuning electrodes 17 the optical signals are combined by the combiner 16.

The DC tuning electrodes 17 are proximate to the electro-optic waveguides 3,4,5,6 such that the DC electric field from the electrodes 17 alters the refractive index of the associated electro-optic waveguides 3,4,5,6. By varying the DC potential one can tune the optical signals such that they combine in quadrature in the optical combiner 16. The modulator 1 of this embodiment comprises two DC tuning electrodes 17. In an alternative embodiment the modulator 1 comprises four DC tuning electrodes 17, one for each electro-optic waveguide 3,4,5,6. In a further alternative the modulator 1 comprises only one DC tuning electrode 17 extending across first primary and first secondary electrodes 3,4.

The linearised electro-optic modulator 1 according to the invention is designed to have an improved linear optical transmission function for applied modulation voltage (L-V function) over a wide bandwidth. If the modulator 1 only comprised the inner two electro-optic waveguides 4,6 the spurious free dynamic range would be limited to about 70 dB in a 1 MHz bandwidth due to the third harmonic appearing above the noise floor of the output. In this embodiment, the outer pair of electro-optic waveguides 3,5 is used to suppress this third harmonic. The primary electro-optic waveguides 3,5 introduce a phase shift approximately three times that in the secondary electro-optic waveguides 4,6. When the optical signals from the primary electro-optic waveguides 3,5 are combined with those from the secondary electro-optic waveguides 4,6 the third harmonic is reduced. This difference in phase change is achieved by having first foot portions 9,12 longer than the second foot portions 10,13.

In order to minimise the third harmonic the optical signals from the primary electro-optic waveguides 3,5 must be added to those in the secondary electro-optic waveguides 4,6 in the correct amplitude ratios. This depends upon the ratio of the phase change in the primary electro-optic waveguides 3,5 to the phase change in the secondary electro-optic waveguides 4,6. Generally, if the phase change in the primary electro-optic waveguides 3,5 is x times that in the corresponding secondary electro-optic waveguides 4,6, the intensity of the optical signal in the secondary electro-optic waveguides 4,6 should be $x^3$ times that in the primary electro-optic waveguides 3,5 to optimise the linear behaviour. In this embodiment the optical splitter 15 is arranged such that the intensity of the optical signal in the secondary electro-optic waveguides 4,6 is twenty seven times that in the primary electro-optic waveguides 3,5.

In an alternative embodiment the RF electrodes 7,11 are arranged such that the phase shift in the primary electro-optic waveguides 3,5 is twice that in the secondary electro-optic waveguides 4,6. This phase shift optimises the second harmonic of the L-V function for maximum linearity and consequently spurious free dynamic range. The optical splitter 15 is arranged such that the intensity of the optical signal in the secondary electro-optic waveguides 4,6 is eight times that in the primary electro-optic waveguides 3,5.

Variations from these ratios can be tolerated and still give acceptable device performance. Phase change ratios between primary and secondary electro-optic waveguides in the range 1.5:1 to 4:1 are acceptable, preferably 1.5:1 to 2.5:1 and 2.5:1 and 3.5:1, more preferably 1.8:1 to 2.2:1 and 2.8:1 and 3.2:1.

Optical intensity ratios between secondary and primary electro-optic waveguides 4,6,3,5 around the optimum value of 8:1 can be tolerated. Preferably, the ratio is in the range 3:1 to 20:1, more preferably in the range 5:1 to 15:1.

Similarly, intensity ratios between secondary and primary electro-optic waveguides around the optimum value of 27:1 can be tolerated. Preferably, the ratio is in the range 10:1 to 50:1, more preferably in the range 15:1 to 40:1.

In a further embodiment of the invention the fabrication of the device may be carried out using Lithium Niobate or another electro-optic material.

In a further embodiment of the invention the RF travelling wave electrodes may be achieved with a different configuration of signal and ground electrodes such as a co-planar ground signal ground arrangement.

The invention claimed is:

1. A four arm linearised Mach Zehnder modulator comprising:

first and second primary electro-optic waveguides;

first and second secondary electro-optic waveguides, each secondary electro-optic waveguide being arranged adjacent to at least one of the primary electro-optic waveguide;

an RF electrode having a stub extending therefrom, the stub of the RF electrode having a first foot portion extending partially along the first primary electro-optic waveguide and a second foot portion extending at least partially along the first secondary electro-optic waveguide;

an RF ground electrode having a stub extending therefrom, the stub of the RF ground electrode having a first foot portion extending partially along the second primary electro-optic waveguide and a second foot portion extending at least partially along the second secondary electro-optic waveguide;

an optical source for providing an optical signal to the waveguides;

the electrodes being arranged such that when a voltage is applied between the RF electrode and RF ground electrode the magnitudes of the phase shifts experienced by the signals in the primary electro-optic waveguides are the same and the magnitudes of the phase shifts experienced by the signals in the secondary electro-optic waveguides are the same but different to those in the primary electro-optic waveguides.

2. A four arm linearised Mach Zehnder modulator as claimed in claim 1, wherein the electrodes are arranged such that a ratio of a phase change between optical signals in the primary electro-optic waveguides to a phase change between optical signals in the secondary electro-optic waveguides is in the range of 1.5:1 to 4:1.

3. A four arm linearised Mach Zehnder modulator as claimed in claim 2, wherein the electrodes are arranged such that a ratio of the phase change between optical signals in the primary electro-optic waveguides to the phase change between the optical signals in the secondary electro-optic waveguides is in the range of 1.5:1 to 2.5:1.

4. A four arm linearised Mach Zehnder modulator as claimed in claim 3, further comprising an optical splitter for receiving the optical signal from the optical source and splitting the optical signal between the electro-optic waveguides.

5. A four arm linearised Mach Zehnder modulator as claimed in claim 4, wherein the optical splitter splits the optical signal such that the intensity of the optical signal in the secondary electro-optic waveguides is between 3 and 20 times the intensity of the optical signal in the primary electro-optic waveguides.

6. A four arm linearised Mach Zehnder modulator as claimed in claim 4, wherein the optical splitter splits the optical signal such that the intensity of the optical signal in the secondary electro-optic waveguides is between 5 and 15 times the intensity of the optical signal in the primary electro-optic waveguides.

7. A four arm linearised Mach Zehnder modulator as claimed in claim 4, wherein the optical splitter splits the optical signal such that the intensity of the optical signal in the secondary electro-optic waveguides is 8 times the intensity of the optical signal in the primary electro-optic waveguides.

8. A four arm linearised Mach Zehnder modulator as claimed in claim 2, wherein the electrodes are arranged such that a ratio of the phase change between optical signals in the primary electro-optic waveguides to the phase change between the optical signals in the secondary electro-optic waveguides is in the range of 2.5:1 to 3.5:1.

9. A four arm linearised Mach Zehnder modulator as claimed in claim 8, further comprising an optical splitter for receiving the optical signal from the optical source and splitting the optical signal between the electro-optic waveguides.

10. A four arm linearised Mach Zehnder modulator as claimed in claim 9, wherein the optical splitter splits the optical signal such that the intensity of the optical signal in the secondary electro-optic waveguides is between 10 and 50 times the intensity of the optical signal in the primary electro-optic waveguides.

11. A four arm linearised Mach Zehnder modulator as claimed in claim 9, wherein the optical splitter splits the optical signal such that the intensity of the optical signal in the secondary electro-optic waveguides is between 15 and 40 times the intensity of the optical signal in the primary electro-optic waveguides.

12. A four arm linearised Mach Zehnder modulator as claimed in claim 9, wherein the optical splitter splits the optical signal such that the intensity of the optical signal in the secondary electro-optic waveguides is 27 times the intensity of the optical signal in the primary electro-optic waveguides.

13. A four arm linearised Mach Zehnder modulator as claimed in claim 2, further comprising an optical splitter for receiving the optical signal from the optical source and splitting the optical signal between the electro-optic waveguides.

14. A four arm linearised Mach Zehnder modulator as claimed in claim 13, wherein the optical splitter splits the optical signal such that the intensity of the optical signal in the secondary electro-optic waveguides is between 3.375 and 64 times the intensity of the optical signal in the primary electro-optic waveguides.

15. A four arm linearised Mach Zehnder modulator as claimed in claim 2, wherein the electrodes are arranged such that a ratio of the phase change between optical signals in the primary electro-optic waveguides to the phase change between the optical signals in the secondary electro-optic waveguides is in the range of 1.8:1 to 2.2:1.

16. A four arm linearised Mach Zehnder modulator as claimed in claim 2, wherein the electrodes are arranged such that a ratio of the phase change between optical signals in the primary electro-optic waveguides to the phase change between the optical signals in the secondary electro-optic waveguides is 2:1.

17. A four arm linearised Mach Zehnder modulator as claimed in claim 2, wherein the electrodes are arranged such that a ratio of the phase change between optical signals in the primary electro-optic waveguides to the phase change between the optical signals in the secondary electro-optic waveguides is in the range of 2.8:1 to 3.2:1.

18. A four arm linearised Mach Zehnder modulator as claimed in claim 2, wherein the electrodes are arranged such that a ratio of the phase change between optical signals in the primary electro-optic waveguides to the phase change between the optical signals in the secondary electro-optic waveguides is 3:1.

19. A four arm linearised Mach Zehnder modulator as claimed in claim 1, further comprising an optical splitter for receiving the optical signal from the optical source and splitting the optical signal between the electro-optic waveguides.

20. A four arm linearised Mach Zehnder modulator as claimed in claim 1, wherein each of the electrodes comprises a plurality of stubs, each stub comprising first and second foot portions.

21. A four arm linearised Mach Zehnder modulator as claimed in claim 1, further comprising an optical combiner for receiving the optical signals from the electro-optic waveguides and combining amplitudes of the signals to produce an output optical signal.

22. A four arm linearised Mach Zehnder modulator as claimed in claim 21, further comprising at least one DC tuning electrode proximate to at least one electro-optic waveguide, the DC tuning electrode being connected to a DC power supply.

23. A four arm linearised Mach Zehnder modulator as claimed in claim 22, wherein the DC tuning electrodes adjust the phase of optical signals in at least one of the primary and secondary electro-optic waveguides such that the combiner combines the signals in quadrature.

24. A four arm linearised Mach Zehnder modulator as claimed in claim 1, further comprising an RF signal source connected to the RF electrode and the RF ground electrode so as to provide a modulation signal for modulation of the optical signals propagating in the electro-optic waveguides.

25. A four arm linearised Mach Zehnder modulator as claimed in claim 1, further comprising at least one DC tuning electrode proximate to at least one electro-optic waveguide, the DC tuning electrode being connected to a DC power supply.

26. A four arm linearised Mach Zehnder modulator as claimed in claim 25, comprising a DC tuning electrode proximate to each electro-optic waveguide, each DC tuning electrode being connected to a DC power supply.

27. A four arm linearised Mach Zehnder modulator as claimed in claim 1, wherein the electrodes are adapted such that a propagation velocity of an electromagnetic wave therein is matched to a propagation velocity of the optical signals in the electro-optic waveguides.

28. A four arm linearised Mach Zehnder modulator as claimed in claim 1, wherein the first and second primary electro-optic waveguides are parallel.

29. A four arm linearised Mach Zehnder modulator as claimed in claim 1, wherein the first and second secondary electro-optic waveguides are parallel.

30. A four arm linearised Mach Zehnder modulator as claimed in claim 1, wherein all four electro-optic waveguides are parallel, the first and second secondary electro-optic waveguides being arranged between the first and second primary electro-optic waveguides.

\* \* \* \* \*